United States Patent [19]
Touchton et al.

[11] Patent Number: 5,576,694
[45] Date of Patent: Nov. 19, 1996

[54] ELECTRONIC ANIMAL CONTROL SYSTEM WITH MASKING SIGNAL GENERATOR

[75] Inventors: Scott F. Touchton, Malvern; Albert T. Ernst, Jr., Pottstown, both of Pa.

[73] Assignee: Invisible Fence Company, Inc., Malvern, Pa.

[21] Appl. No.: 449,211

[22] Filed: May 24, 1995

[51] Int. Cl.⁶ .................................................. A01K 3/00
[52] U.S. Cl. ................................. 340/573; 119/721
[58] Field of Search ............................. 340/573; 119/721

[56] References Cited

U.S. PATENT DOCUMENTS

| | | | |
|---|---|---|---|
| 5,121,711 | 6/1992 | Aine | 119/721 |
| 5,425,330 | 6/1995 | Touchton et al. | 119/721 |

*Primary Examiner*—Glen Swann
*Attorney, Agent, or Firm*—Dann, Dorfman, Herrell & Skillman, P.C.

[57] ABSTRACT

A disruption generator is provided for use in an electronic animal confinement system for preventing undesirable correction of the animal in the vicinity of incidental conductive structures capable of coupling and re-radiating a transmitter signal for controlling the animal. The disruption generator produces a disruption signal for masking, preventing, or otherwise interfering with reception of the transmitter signal by an animal control receiver device mounted on the animal. The disruption generator can be connected to such incidental conductive structures as utility conduits, door frames, household wiring, and the like, to prevent undesirable correction of the animal in the vicinity thereof due to inductive or resonant coupling of the transmitter signal by such structures. Additionally, the disruption generator can be connected to a disruption antenna for providing a portion of the animal control area, for example, a corridor across the perimeter of the area, in which the animal control receiver will not apply a correction stimulus to the animal.

36 Claims, 6 Drawing Sheets

ELECTRONIC ANIMAL CONTROL SYSTEM
WITH MASKING SIGNAL GENERATOR

FIELD OF THE INVENTION

The present invention relates to an electronic animal control system employing a portable radio receiver worn by the animal for controlling the movement of the animal relative to a selected area. More particularly, the invention relates to an animal control system having a masking signal generator for disrupting reception of a predetermined electromagnetic control signal by the receiver in the vicinity of incidental electromagnetic coupling and re-radiating structures that may be present within the vicinity of the selected area.

BACKGROUND OF THE INVENTION

Electronic animal control systems have been used wherein a radiofrequency receiver device is mounted upon an animal to control the movement of the animal relative to a predetermined area such as a yard. A transmitter that produces a predetermined electromagnetic signal is connected with a transmission antenna positioned at the selected area for radiating the electromagnetic signal at the selected area such as along the perimeter of the area. The receiver device is adapted to detect the predetermined electromagnetic signal and, in response; deliver a correction stimulus, such as a mild shock or audible signal, to the animal. It has been observed in the operation of various animal control systems, that the selected area relative to which the movement of the animal is to be controlled, often includes incidental conductive structures that can couple and re-radiate the transmitter signal in undesired areas. The incidental structures function as "coupling structures" relative to the transmitter signal radiated from the transmission antenna. For example, residential locations are often supplied with various utilities, such as water, cable television, electrical power, telephone service, and the like, by overhead or underground conductors (pipes, wires, cables, &c.) that cross the property lines of the residence and then are distributed throughout the residence. Depending upon the topology of the conductors or their proximity to the transmitting antenna along their respective routes, the transmitter signal can induce a similar signal within such conductors. The conductors may then, in effect, distribute the transmitter signal to undesired locations at the residence by re-radiating the induced signal along their respective routes.

Other conductive or metallic structures within or about the vicinity of the transmission antenna at the selected area may also act as undesirable coupling structures. For example, a metallic door frame can provide a conductive loop that acts as a receiving antenna for coupling the signal generated by the transmitter. Although the transmitted signal may be relatively weak in the vicinity of the door frame, the door frame may happen to have an electrical characteristic that sufficiently resonates at the carrier frequency to amplify the coupled signal and to radiate the amplified signal.

The primary undesirable result of the presence of incidental coupling structures is that the animal occasionally receives the correction stimulus in areas where the stimulus is not intended to be applied. Such unintended stimulation of a dog can habituate the dog to being stimulated by the receiver, thus contributing to decreased effectiveness of the animal control system to confine the dog. Additionally, such unintended stimulation can contribute to undesirable behavior of the dog.

SUMMARY OF THE INVENTION

In accordance with the present invention, an electronic animal control system is provided wherein a transmitter is connected with a transmission antenna for transmitting a predetermined electromagnetic signal. The transmission antenna is positioned at or about a selected area at which the animal is to be controlled. A receiver is mounted upon the animal for detecting the predetermined electromagnetic signal and, in response, applying a selected stimulus to the animal. The animal control system further includes a disruption generator for connection to incidental coupling structures in the vicinity of the animal control system. The disruption generator produces a masking signal to interfere with re-radiation of the transmitter signal from the coupling structure to inhibit the receiver from detecting the predetermined signal, or to prevent the coupling structure from re-radiating a signal that would otherwise be detected by the receiver as the predetermined transmitter signal.

In accordance with another aspect of the invention, a disruption generator is provided for connection to an incidental coupling structure in the vicinity of an electronic animal control system. The disruption generator is configured to generate a disruption signal having a carrier frequency that is substantially the same as a carrier frequency of the animal control transmitter. The disruption generator is further configured to modulate the disruption signal according to a disruption modulation component that differs from a modulation component of the transmitter signal. The character of the disruption modulation component differs from the modulation component of the transmitter signal in such a manner as to prevent the receiver from detecting a valid transmitter signal modulation component in the vicinity of the coupling structure.

According to yet another aspect of the invention, an electronic animal control system is provided wherein a disruption generator is connected with an antenna. A portion of the disruption antenna is located adjacent to the transmission antenna of the animal control system defining a corridor along which the animal may approach or cross the transmission antenna without receiving a correction stimulus.

BRIEF DESCRIPTION OF THE FIGURES

Further aspects of the invention, and advantages pertaining thereto, are described in greater detail hereinbelow in conjunction with the attached drawings in which.

DETAILED DESCRIPTION OF THE PREFERRED EMBODIMENTS

Figure 1:
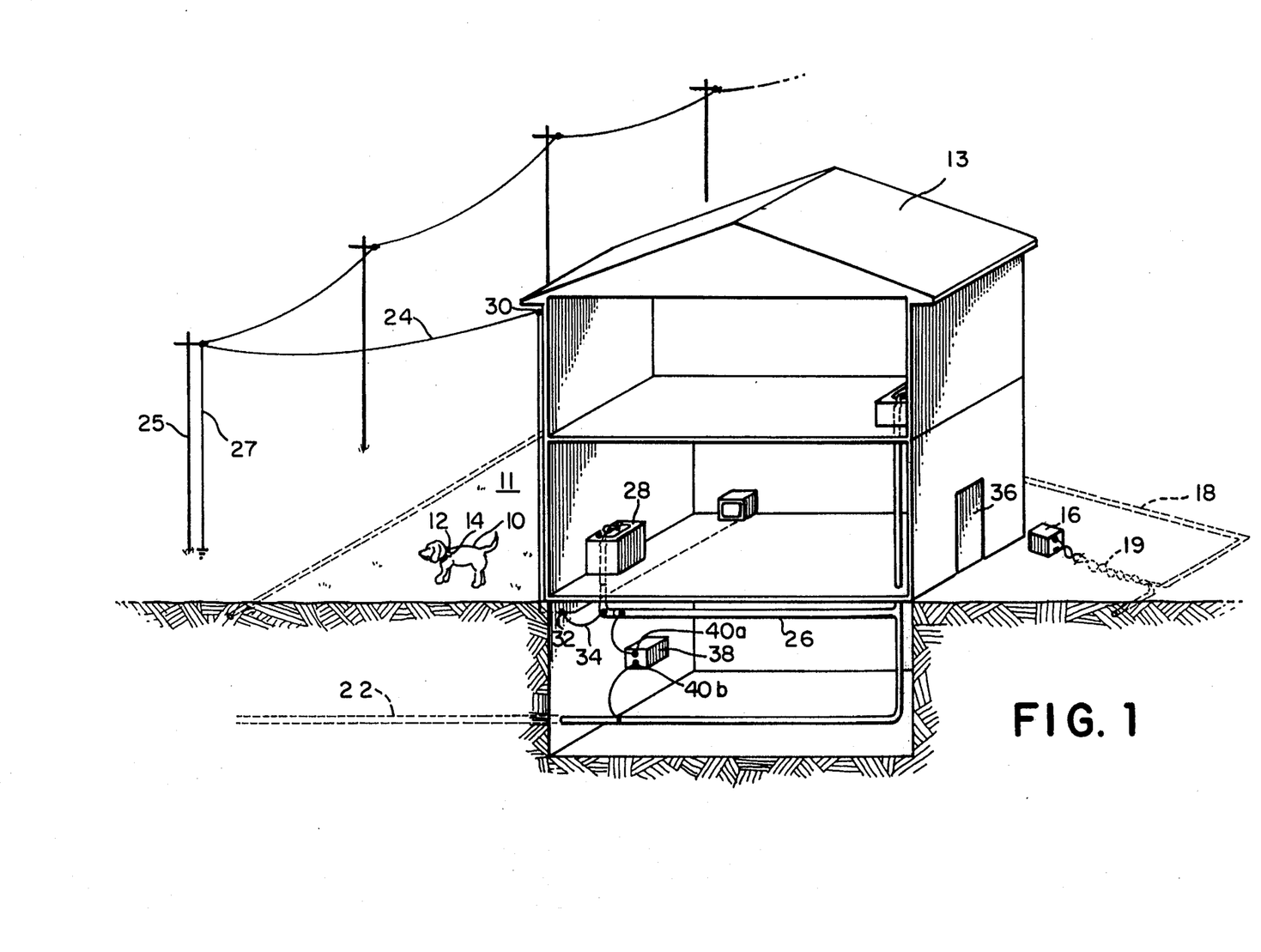
FIG. 1 is a sectional view of a residence having an electronic animal control system.

Referring now to FIG. 1, there is shown a residence having an electronic animal control system for confining an animal, such as a dog 10, to a predetermined area, such as a yard 11 about a house 13. The dog 10 is equipped with a control collar 12. A receiver 14 is mounted upon the control collar 12. The receiver 14 includes a detection circuit for detecting the presence of a predetermined electromagnetic signal and for applying a selected stimulus, such as an audible and/or electrical stimulus, to the dog 10 in response to the detection of a predetermined electromagnetic signal.

The predetermined electromagnetic signal is generated by transmitter 16, which is connected to a transmission antenna 18. The antenna 18 is preferably a buried wire loop antenna for radiating the electromagnetic signal and for positioning at the area in which the dog 10 is to be confined. Alternatively, the antenna may be positioned to provide an area from which the dog 10 is to be discouraged from entering. In either case, when the dog 10 approaches the antenna 18, the receiver 12 detects the predetermined electromagnetic signal and applies a selected stimulus to the dog. In order to provide for remote location of the transmitter 16 relative to the antenna 18, the antenna 18 is connected to the transmitter 16 by a twisted pair of conductors 19 that confine the electromagnetic signal therebetween.

The animal control system, including the transmitter 16, the antenna 18, and the receiver 12, are preferably of the type described in U.S. Pat. No. 5,425,330, issued Jun. 20, 1995, which is incorporated by reference herein. The electromagnetic signal produced by the transmitter 16 includes a carrier component and a modulation component. The receiver 12 is tuned to receive the carrier component and to authenticate the electromagnetic signal by verifying the presence of the modulation component in the received signal.

Figure 2:
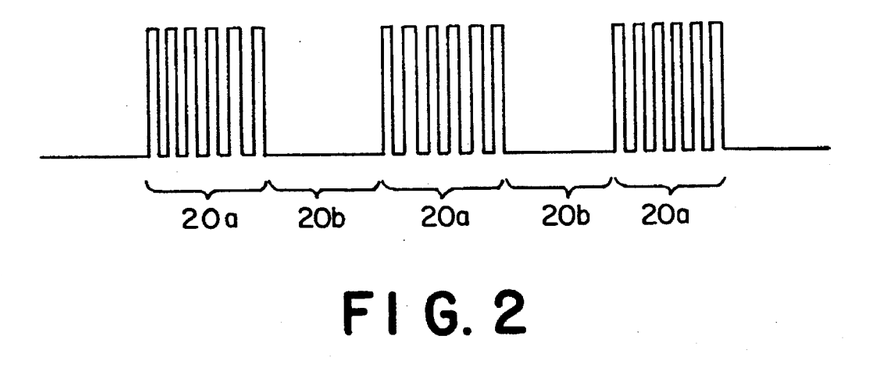
FIG. 2 is a waveform diagram of a transmitter signal utilized within the electronic animal control system of FIG. 1.

The carrier component of the transmitted electromagnetic signal preferably comprises a pulsed signal having a carrier frequency that is selectable among values of about 7 kHz and about 10 kHz to prevent neighboring animal control systems from interfering with each other. The modulation component of the electromagnetic signal preferably comprises a square wave having a significantly lower frequency than the carrier, such as about 30 Hz. Such an electromagnetic signal, as shown in FIG. 2, is characterized by alternating 15 ms time intervals 20a of activity and 20b of inactivity. In verifying the authenticity of a received signal, the receiver determines whether the received signal is above a selected threshold amplitude and exhibits, within a predetermined tolerance, one or more intervals of activity at the carrier frequency interspersed with one or more intervals of inactivity below a threshold amplitude. If the received signal exhibits activity at the carrier frequency during an interval when the transmitter signal is expected to be inactive, then the receiver does not apply the selected stimulus to the dog 10. Similarly, no stimulus is applied if the received signal exhibits inactivity during an interval when the transmitter signal is expected to be active.

Referring again to FIG. 1, the house 13 is supplied with utilities such as water, via a water supply pipe 22, and cable television, via a cable television (CATV) line 24. Within the house 13, the water supply pipe 22 is connected to a plumbing system that includes a sink supply pipe 26 which supplies water to a sink 28. The CATV line 24 is suspended between a utility pole 25 and a cable suspension hook 30 attached to the house 13. From the hook 30, the CATV line 24 hangs vertically against the side of the house 13 and extends into the house through a feedthrough 32 located in the basement.

The CATV line 24 is a coaxial cable having a outer conductor, or jacket, that is grounded at a location beyond the perimeter of the yard, such as by grounding wire 27 at the utility pole 25. It is customary to also ground the jacket of a CATV line at a location within the house near the point of entry of the CATV line. For example, the jacket of CATV line 24 is connected to sink supply pipe 26 by a grounding strap 34. A conductive loop is thereby established from grounding strap 34, sink supply pipe 26, and water supply pipe 22, extending through the ground to grounding wire 27, and then returning to the house along the jacket of CATV line 24. As shown in FIG. 1, the conductive loop surrounds a portion of the transmission antenna 18. Hence, a portion of the signal radiated by the transmission antenna 18 will be inductively coupled into the loop. The coupled signal will then be re-radiated along the loop, including inside the house along the sink supply pipe 26. In the absence of any countermeasures, the re-radiation can cause the receiver 12 to receive the re-radiated signal, verify the presence of the predetermined modulation characteristic, and then apply the selected stimulus to the dog 10 when the dog 10 is located within the house 13 in the vicinity of the sink supply pipe 26. If the dog 10 is permitted to be within the vicinity of the sink supply pipe 26, such as on the floor above the pipe 26, then such coupling and re-radiation of the transmitter signal would be highly undesirable.

Other metallic structures within or about the house 13 may also couple and re-radiate the transmitted signal. For example, a metallic door frame 36 forms a conductive loop that can act as a receiving antenna for coupling the signal generated by the transmitter 16. Although the strength of the transmitted signal may be relatively weak in the vicinity of the door frame 36, the door frame 36 may happen to have an electrical characteristic that sufficiently resonates at the carrier frequency to amplify the coupled signal. Still other residential metallic structures, such as telephone lines, power lines, appliances, railings, furniture components, audio systems and the like, may undesirably couple and re-radiate the transmitted signal with the undesirable result that the dog 10 may occasionally receive the selected stimulus in areas where the stimulus is not intended to be applied.

In order to eliminate undesirable stimulation of the dog due to re-radiation of the transmitter signal from an incidental coupling structure, a disruption generator is connected to the incidental coupling structure. The disruption generator produces a disruption signal that prevents the coupling structure from transmitting a signal that would be verified by the receiver as the intended transmitter signal. For example, a disruption generator 38 is located within the basement of the house 13. The disruption generator 38 includes a pair of terminals 40a,b that are respectively connected to the sink supply line 26 and to the water supply line 22. Alternatively, the disruption generator 38 can be connected to the opposite ends of the sink supply line 26, or to respective ends of a portion thereof defining a length of the sink supply line along which it is desired to disrupt, mask, or otherwise interfere with reception of a re-radiated transmitter signal.

In the preferred embodiment, the disruption generator 38 produces a signal that is adapted to disrupt the modulation verification function of the receiver 12. For example, the receiver 12 may be of the type that is operative to determine whether the received signal exhibits a prescribed interval of inactivity below a selected amplitude threshold. In order to prevent successful verification, according to one embodiment of the invention, the disruption generator 38 produces a disruption signal at about the same carrier frequency as the transmitter, but having a different modulation characteristic. For example, if the transmitter produces a transmission signal at 7 kHz with 30 Hz modulation (thus having approximately 15 ms inactive and active intervals), the disruption generator 38 can be configured to produce an unmodulated disruption signal (i.e. having a modulation frequency of zero Hz.) at the carrier frequency of 7 kHz. Alternatively, the disruption generator 38 can be configured to produce a disruption signal at the carrier frequency having a modulation frequency greater than modulation frequency of the transmitter signal. Hence, when the dog is located within the vicinity of the structure coupled to the disruption generator 38, the receiver will fail to detect any interval in which the received signal exhibits an inactive interval that is as long as the inactive interval of the expected transmitter signal.

In other embodiments, the disruption generator can be configured to detect the coupled signal and to produce a disruption signal that is out of phase with respect to the modulation component of the transmitter signal. In still other embodiments, the disruption generator can be configured to detect the coupled signal within the coupling structure and to employ a 180° phase feedback amplifier to produce a disruption signal that will cancel, or null, the coupled signal. In such an embodiment, the receiver will be prevented from determining that the amplitude of the received signal is above the selected threshold amplitude for verification, and hence will fail to detect the active interval of the transmitter signal.

Figure 3:
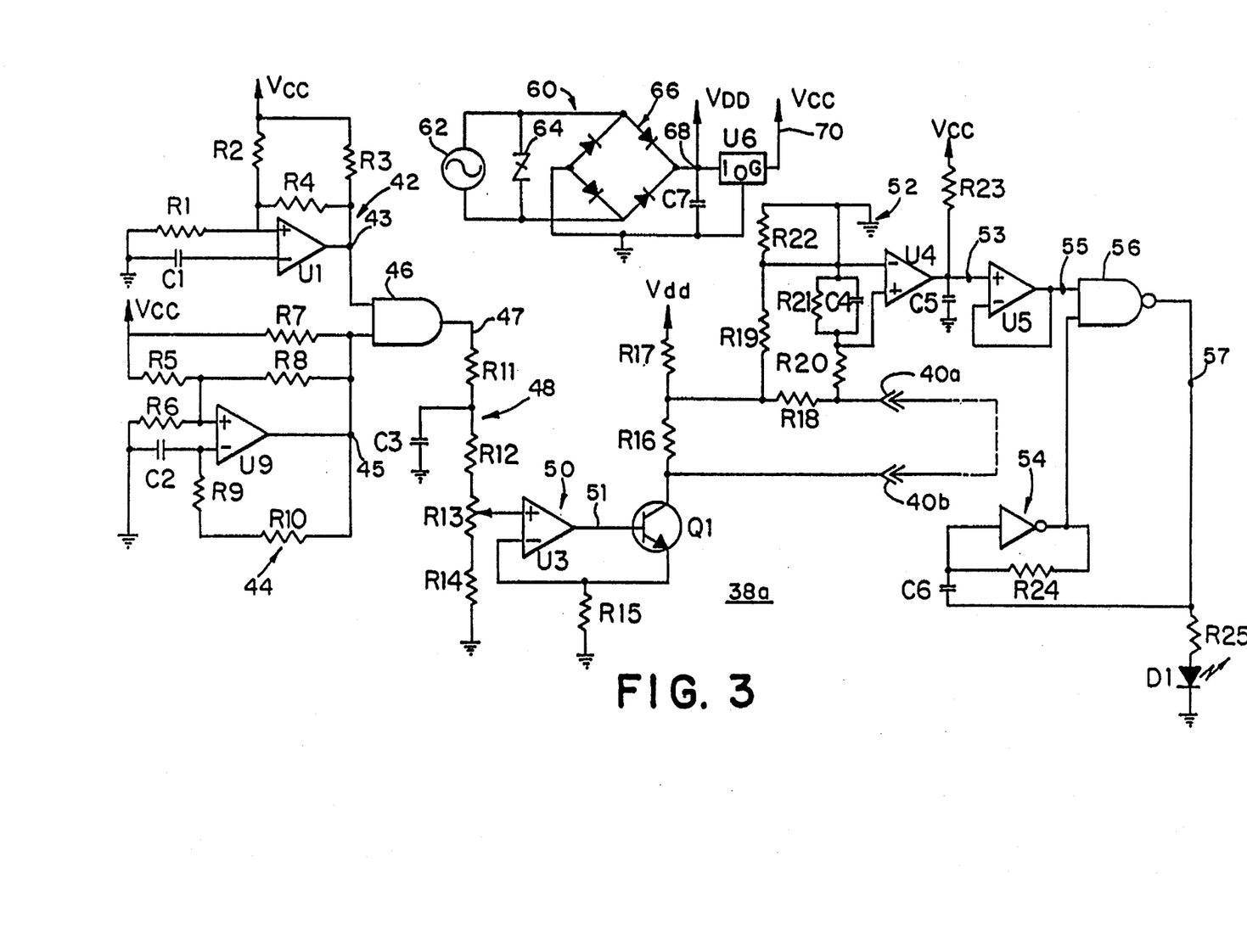
FIG. 3 is a schematic diagram of a disruption generator employed within the animal control system of FIG. 1.

Referring now to FIG. 3, there is shown a schematic diagram of a preferred disruption generator 38a. Values and types of the electronic components of FIG. 3 are listed in Table 1. The logic gates shown in FIG. 3 are preferably implemented using a 4011 quad NAND IC.

TABLE 1

| Component Values for FIG. 3 | |
| --- | --- |
| R1–2, R4–6, R8, R23 | 100 kΩ |
| R3, R7, R19–20, R25 | 1 kΩ |
| R9 | (frequency-selected) |
| R10 | 690 Ω |
| R11 | 10 kΩ |
| R12 | 69 kΩ |
| R13 | 1 kΩ pot. |
| R14 | 470 Ω |
| R15 | 1 Ω |
| R16 | 220 Ω |
| R17 | 30 Ω |
| R18 | 56 Ω |
| R21 | 1.3 kΩ |
| R22 | 930 Ω |
| R24 | 420 kΩ |
| C1 | .068 µF |
| C2 | .001 µF |
| C3 | 1000 pF |
| C4–6 | .47 µF |
| C7 | 1000 µF |
| U1–4 | LM339 operational amplifier (quad) |
| U5 | LM358 comparator |
| U6 | LM7812 12-Volt regulator |
| Q1 | 2N3904 NPN BJT |

The disruption generator 38a includes a pair of oscillators 42 and 44. Oscillator 44 is a carrier frequency oscillator having a frequency control resistor R9 that is selected at the time of manufacture to cause the oscillator 44 to produce a selected carrier oscillation signal at terminal 45. Oscillator 42 is a modulation signal oscillator for producing a modulation signal at terminal 43. The carrier signal is preferably between about 5 kHz and 15 kHz, and is most preferably either 7 kHz or 10 kHz. The modulation signal produced by oscillator 42 has a frequency that is greater than the modulation frequency of the animal control transmitter. Preferably, the modulation frequency is greater than twice the modulation frequency of the animal control transmitter. For example, in an embodiment employing animal control devices having a modulation frequency of 30 Hz, the modulation component of the disruption signal is preferably selected to be about 100 Hz.

The carrier signal and the modulation signal are provided, via respective signal lines 45 and 43, to AND gate 46. The AND gate 46 combines the carrier signal and the modulation signal to provide a modulated signal on line 47. The modulated signal on line 47 is connected to a voltage divider, comprising resistors R11–14. The voltage divider 48 includes a capacitor C3 for providing a low-pass filter for substantially removing high frequency components of the modulated signal. Such high frequency components could otherwise cause undesirable radio frequency emissions. The filtered modulated signal is provided to a variable-gain amplifier 50 employing operational amplifier U3 which is controlled by adjustment of resistor R13. The variable-gain amplifier 50 reproduces the filtered modulated signal at an amplitude determined by the setting of R13, and provides the resulting output signal to the base of transistor Q1 via line 51. The emitter of transistor Q1 is connected with a 1 Ω grounded resistor R15 for providing a current sink to electrical current received by the collector of transistor Q1 from terminal 40b of the disruption generator 38a. The amount of current that is conducted through transistor Q1 from terminal 40b to ground is controlled by the signal on line 51.

Terminal 40a is connected, within the disruption generator 38a, to an unregulated supply voltage, Vdd, via current-limiting resistor R17 and sense resistor R18. When terminals 40a and 40b are connected to the incidental coupling structure (indicated by dashed lines in FIG. 3), current will flow from terminal 40a through the coupling structure to terminal 40b in accordance with the modulated signal supplied to the base of transistor Q1. A 220 Ω damping resistor R16 is connected in parallel with the coupling structure in order to reduce any undesirable inductive oscillations that may be caused by the inductance of the coupling structure. Because the output terminals 40a and 40b may be connected to structures that are vulnerable to electrostatic discharges or lightning strikes, a surge arrestor, such as a triggered spark gap, may be connected between the terminals 40a and 40b, or between ground and each of the terminals 40a and 40b, or both, to provide transient voltage protection for the generator 38a.

Sense resistor R18 is connected in series with the coupling structure to provide a mechanism for detecting an open circuit between terminals 40a and 40b. An averaging circuit 52 is connected in parallel with sense resistor 18 for averaging the voltage drop across sense resistor R18 and providing an inverted average voltage signal on line 53. The averaging circuit 52 produces a low voltage signal at line 53 as long as electrical continuity is maintained between terminals 40a and 40b. The time constant of the averaging circuit 52 is selected to be greater than the period of the modulation signal. Line 53 is connected as an input to operational amplifier U5 which serves as a buffer. Operational amplifier U5 produces a "low" logic signal on line 55 as long as a low voltage is present on line 53. If electrical continuity between terminals 40a and 40b is broken, then the voltage drop across R18 goes to zero, and the voltage presented to the non-inverting input of operational amplifier U4 will rise above the voltage presented to the inverting input according to the charging time of capacitor C4. Then, the output voltage of averaging circuit 52 will increase, providing a "high" logic signal on line 55.

The logic signal on line 55 is provided as an input to a NAND gate 56. The other input to NAND gate 56 is provided by an oscillator 54. When the logic signal on line 55 is "low," the output signal of the NAND gate 56, on line 57, will be "high." When the logic signal on line 55 is "high," the output signal of NAND gate 56 will oscillate in accordance with the output of oscillator 54. Line 57 provides power to a light emitting diode (LED), D1. Hence, the light emitting diode D1, will constantly remain on when current is flowing from terminal 40a to 40b. If the continuity between terminals 40a and 40b is broken, the LED D1 will blink. Hence, the user will be alerted to a broken or improper connection to the coupling structure. Such notification is convenient in applications where the connections to the coupling structure are to be made at a location where numerous conductors, and hence numerous opportunities for improper connection, exist. Moreover, if connection is to be made to two remote ends of an elongated coupling structure, the LED provides an indication that the connections have been correctly made at both ends.

Electrical power for the disruption generator 38a is provided by a power supply circuit 60. The power supply circuit 60 is connected with a source of AC power, such as a wall transformer 62. A bi-directional threshold voltage conduction device, such as a metal-oxide varistor 64, is provided in parallel with the terminals of the wall transformer 62 in order to provide transient voltage protection. A rectifying bridge 66 is connected across the terminals of the wall transformer 62 for providing a full-wave rectified voltage at terminal 68. Capacitor C7 is connected between terminal 68 and ground for smoothing the full-wave rectified voltage, thus providing an unregulated DC voltage, Vdd, at terminal 68. Voltage regulator U6 is connected with terminal 68 to provide a regulated voltage, Vcc, at terminal 70. The regulated voltage Vcc, is employed to power the oscillators 42 and 44, as well as the other active components of the disruption generator 38a. The unregulated voltage Vdd is employed to provide current to the coupling structure. The unregulated supply voltage is preferable for use in connection with the coupling structure because the provision of such a relatively high level of current, compared to the combined supply current of the integrated circuits, might otherwise cause undue power dissipation in the regulator U6.

In an alternative embodiment, oscillator 42 and NAND gate 46 may be eliminated. The disruption signal would comprise a constant carrier signal for masking the re-radiated signal from the coupling structure. However, it is preferable to provide oscillator 42 for modulating the carrier signal in order to decrease the amount of power consumed in generating the disruption signal, thereby minimizing the size of wall transformer 62.

An additional power-conserving feature is provided by the variable gain amplifier 50. When the disruption generator is installed, the gain of amplifier 50, controlled by potentiometer R13, is initially set to a minimum value. The terminals 40a and 40b are then connected to respective ends of the identified or suspected coupling structure. The installer may then test whether the disruption signal is sufficient to mask the re-radiated signal by moving the control collar about the vicinity of the coupling structure (preferably, having first removed the collar from the dog). If the collar responds by producing the selected correction stimulus, then the gain of amplifier 50 is incrementally increased and the area is re-tested. Such calibration of the disruption generator 38 ensures that the minimum required level of current will be supplied from the power supply to the coupling structure to achieve the desire masking or interference effect.

Figure 4:
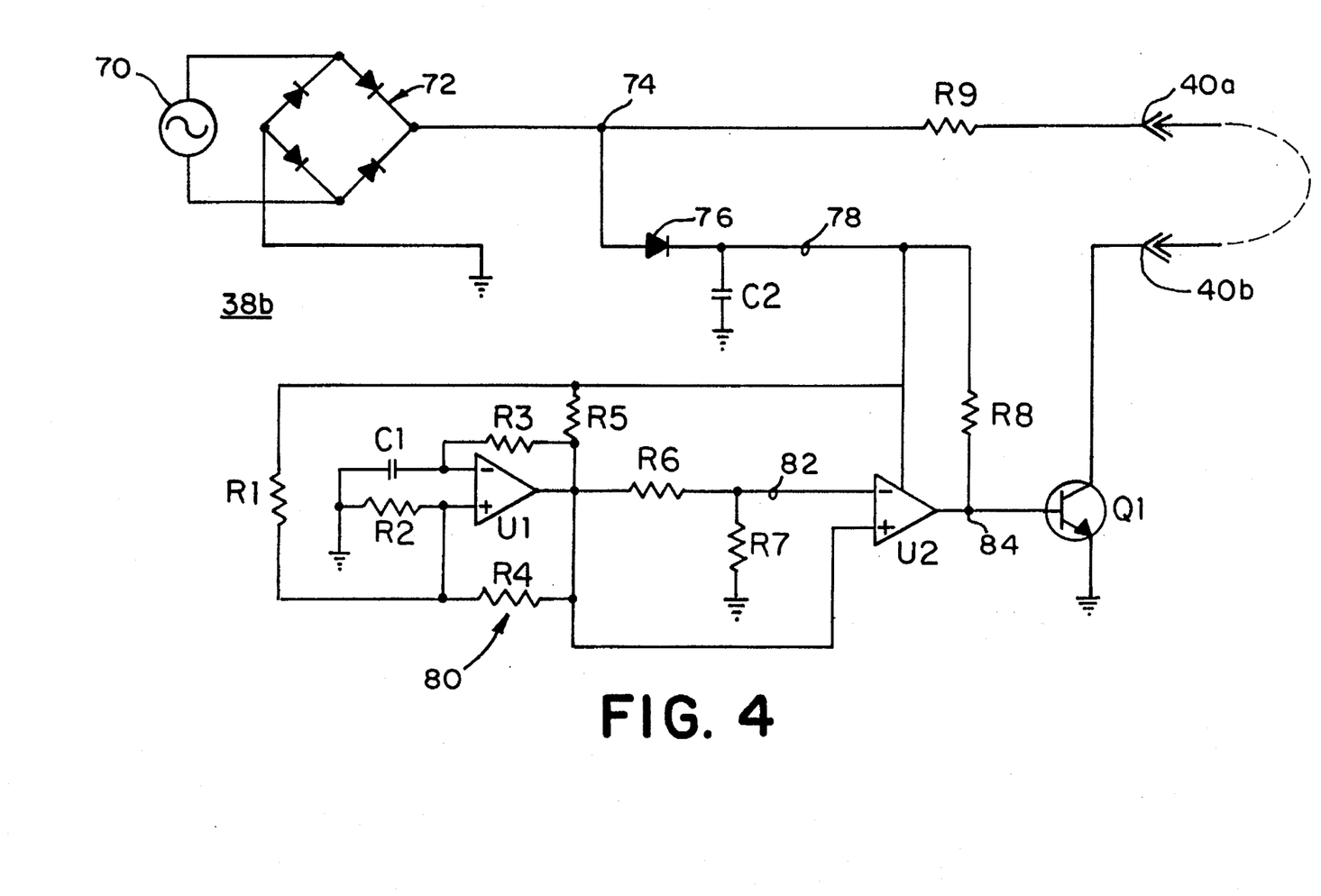
FIG. 4 is a schematic diagram of an alternative disruption generator for use within the animal control system of FIG. 1.

Referring now to FIG. 4 there is shown a schematic diagram of an alternative disruption generator 38b. Values and types of the electronic components shown in FIG. 4 are listed in Table 2.

TABLE 2

Component Values for FIG. 4

| | |
|---|---|
| R1–2, R4, R7 | 100 kΩ |
| R3 | (frequency-selected) |
| R5 | 2 kΩ |
| R6, R8 | 4.7 kΩ |
| R9 | 120 Ω |
| C1 | .001 µF |
| C2 | 220 µF |
| U1–2 | LM 339 operational amplifier |
| Q1 | 2N3904 NPN BJT |

The disruption generator 38b employs the 120 Hz U.S. standard frequency (100 Hz where applicable) of full-wave rectified AC power to provide the modulation component of the disruption signal. Thus the disruption generator 38b delivers a modulated disruption signal, yet requires only one oscillator. Power is supplied from an AC wall transformer 70 to a full-wave bridge rectifier 72. The rectifier 72 provides a full-wave rectified AC signal on line 74. The voltage on line 74 is provided to terminal 40a via current limiting resistor R9.

An isolation diode 76 is connected with line 74. The output terminal of diode 76 is connected with grounded capacitor C2 for providing a DC voltage on line 78. The DC voltage on line 78 is employed to provide power to carrier oscillator 80 and buffer amplifier U2. The oscillation frequency of carrier oscillator 80 is controlled by the value of resistor R3, which is selected at the time of manufacture to match the selected carrier frequency of the animal control transmitter with which the disruption generator 38b is to be employed. The carrier signal produced by oscillator 80 is conducted along line 82 to buffer amplifier U2. The buffer amplifier U2 drives the base of current-sinking transistor Q1, and isolates the oscillator 80 from the low impedance emitter of transistor Q1. The collector of transistor Q1 is connected with terminal 40b. Although a full-wave rectified voltage is present at terminal 40a, the current that is conducted from terminal 40a and through the coupling structure to terminal 40b fluctuates according to the carrier signal applied to the base of transistor Q1. Hence, the disruption generator 38b provides a modulated disruption signal while employing significantly fewer components than the disruption generator 38a described in connection with FIG. 3.

Figure 5:
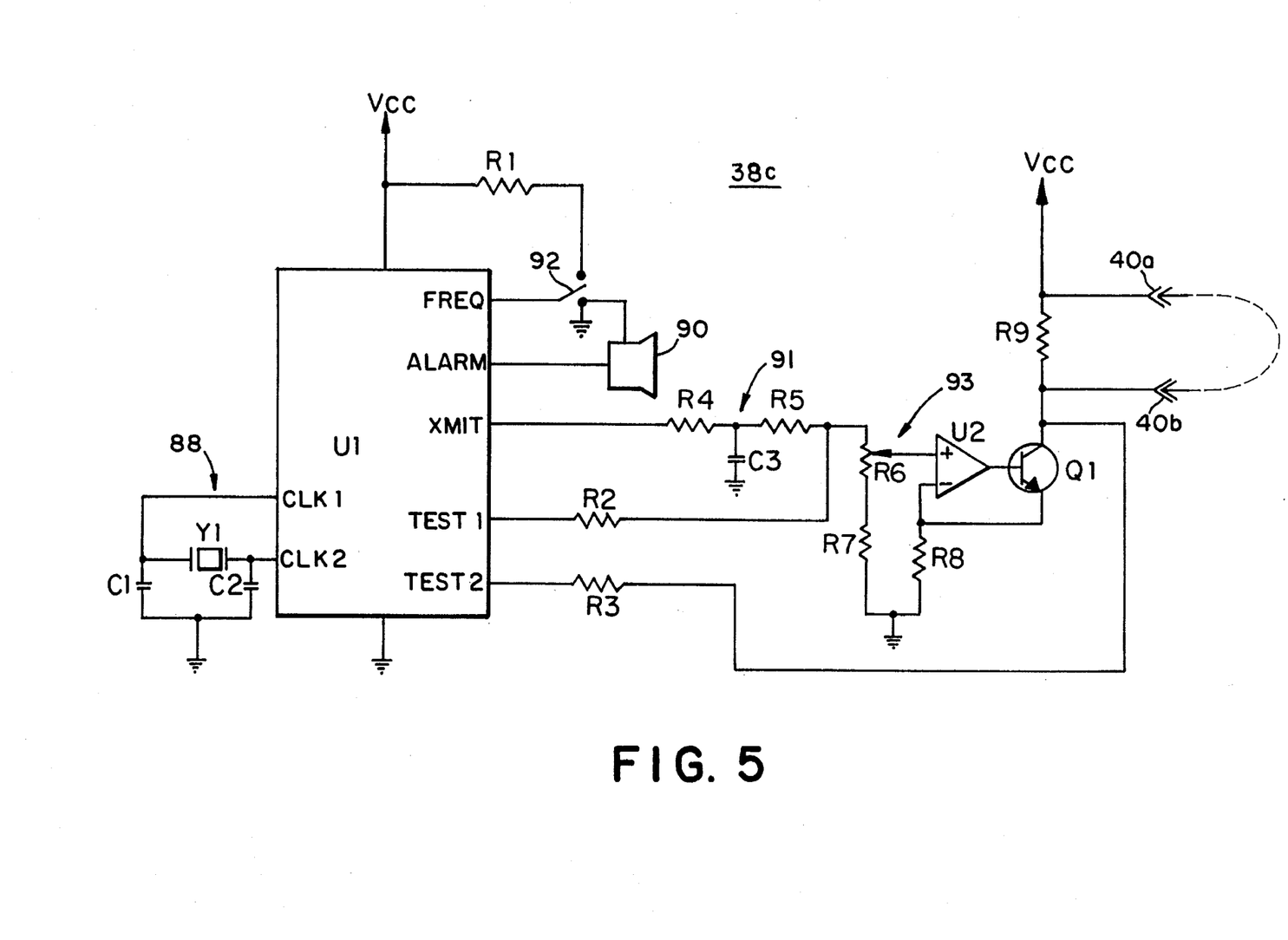
FIG. 5 is a schematic diagram of another alternative disruption generator for use within the animal control system of FIG. 1.

Referring now to FIG. 5, there is shown a schematic diagram of a microcontroller-based disruption generator 38c. Values and types of electronic components of FIG. 5 are listed in Table 3.

TABLE 3

Component Values for FIG. 5

| | |
|---|---|
| R1, R3 | 10 kΩ |
| R2 | 2.2 kΩ |
| R4 | 1 kΩ |
| R5 | 2.7 kΩ |
| R6 | 1 kΩ pot. |
| R7 | 220 Ω |
| R8 | 10 Ω |
| R9 | 220 Ω |
| C1–2 | 100 pF |
| C3 | .01 μF |
| U1 | PIC16C54 microcontroller |
| U2 | LM358 comparator |
| Y1 | 4.00 MHz crystal |

Operation of the disruption generator 38c is governed by a PIC16C54 microcontroller U1. The microcontroller U1 is powered by a 5 V supply voltage, Vcc, at a clock frequency of 4 MHz supplied by oscillator 88. Five I/O terminals of the microcontroller, designated as FREQ, ALARM, XMIT, TEST1, and TEST2, are employed to provide the following functions.

The FREQ terminal is employed as an input terminal connected with a switch 92 that is operable by the user to select the carrier frequency of the disruption signal. In the position shown, the switch 92 connects the FREQ terminal with a high logic level, Vcc, via pull-up resistor R1. In the opposite position, the switch 92 connects the FREQ terminal with a low logic level.

The ALARM terminal is a latched-output terminal that is connected with a piezoelectric speaker 90. The ALARM terminal is asserted in response to a determination by the microcontroller that a continuity break exists between the terminals 40a and 40b of the disruption generator 38c. When the ALARM terminal is asserted, the speaker 90 emits an audible tone to alert the user to the detected continuity break.

The XMIT terminal is a latched-output terminal which is toggled by the microcontroller, in accordance with internal timing registers, in order to produce the disruption signal. The XMIT terminal is connected, via low-pass filter 91, to a variable-gain amplifier 93. The low-pass filter 91 removes high frequencies from the disruption signal that would otherwise cause undesirable high-frequency RF emissions from the disruption generator 38c. The variable-gain amplifier 93 amplifies the filtered disruption signal according to a gain set by the user and controlled by potentiometer R6. The resulting signal from amplifier 93 is conducted to the base of transistor Q1. Transistor Q1 provides a current sink, which is modulated in accordance with the disruption signal. Transistor Q1 sinks current that is conducted from Vcc, through terminal 40a to the coupling structure, from the coupling structure into terminal 40b, and then to ground via resistor R8. A damping resistor R9 is connected in parallel with the terminals 40a and 40b for damping undesirable LC oscillations within the coupling structure.

Terminals TEST1 and TEST2 are used by the microcontroller in conjunction with a procedure for testing the continuity between terminals 40a and 40b. During the continuity testing procedure, the XMIT terminal is turned off, and the TEST1 terminal is asserted and latched. The signal from the TEST1 terminal is provided, via resistor R2, as a DC input to the variable gain amplifier 93. Assertion of the TEST1 terminal will cause the transistor Q1 to be maintained in a conductive condition. The TEST2 terminal is connected, via resistor R3, to the collector of transistor Q1. After TEST1 has been asserted for a brief settling period, the microcontroller determines whether a high logic signal or a low logic signal is present at terminal TEST2. If no coupling structure is connected to the terminals, or if continuity between terminals 40a and 40b is otherwise broken, TEST2 will be determined to be in a low logic condition by virtue of the relatively lower resistance of Q1 and R8 compared to R9. If a coupling structure is properly connected between terminals 40a and 40b, TEST2 will be determined to be in a high logic condition due to the short to Vcc provided by the coupling structure.

Figure 6:
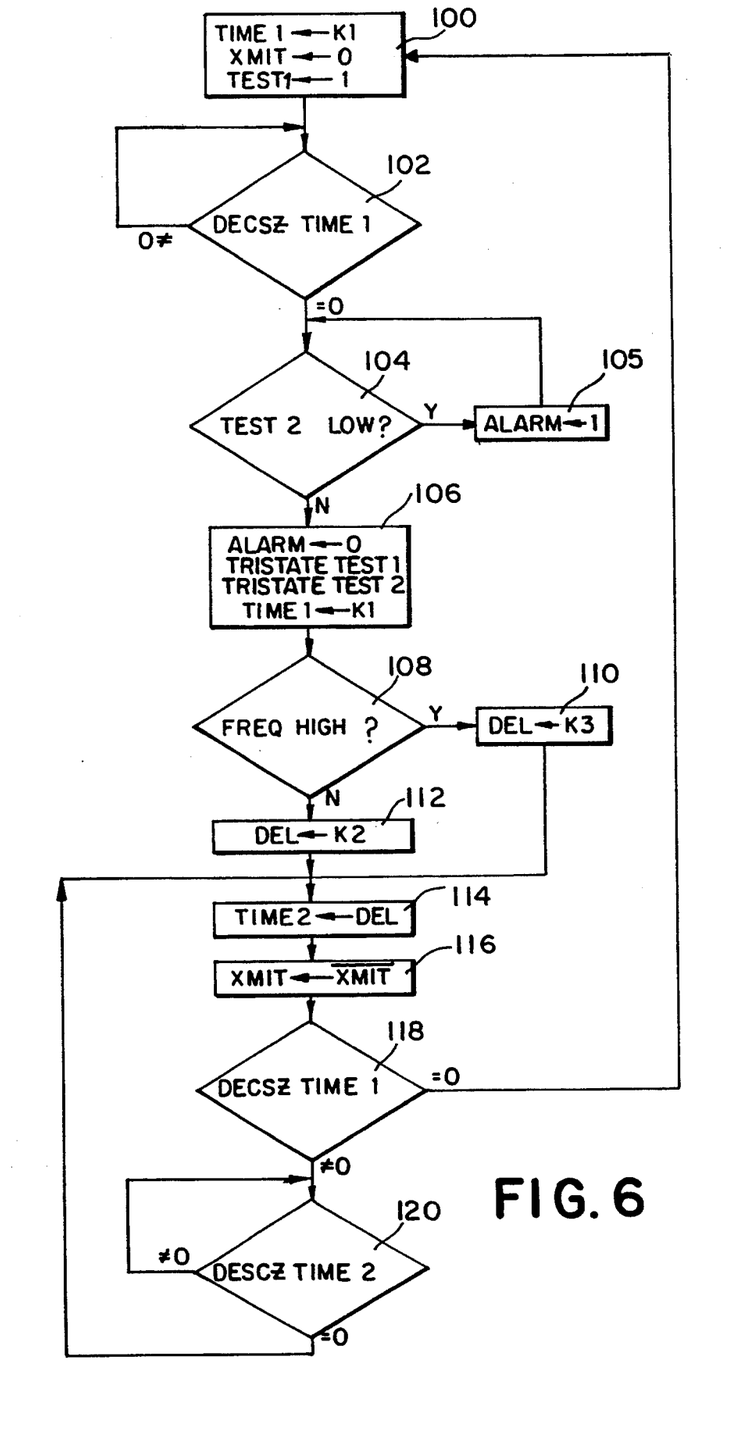
FIG. 6 is a logical flow diagram of a control procedure employed by the disruption generator of FIG. 5.

The order in which the various functions of the microcontroller are performed, shall now be described in connection with the logical flow diagram shown in FIG. 6.

Beginning at step 100, the microcontroller loads an internal register, TIME1, with a predetermined constant value, K1. The TIME1 register is employed as a timeout counter for controlling the modulation frequency of the disruption signal. Proceeding in step 100, the microcontroller sets XMIT to zero and sets TEST1 to 1, in preparation for testing the continuity of the electrical connection to the coupling structure. Then, the microcontroller proceeds to step 102.

In step 102, the microcontroller pauses for an interval of time determined by the constant K1 initially stored in register TIME1. For example, the microcontroller may execute a "decrement, skip on zero" (DECSZ) instruction such that the value contained within TIME1 is decremented and then compared with zero. If the resulting value contained within TIME1 is equal to zero, the microcontroller proceeds to step 104. If the resulting value contained within register TIME1 is not zero, then the microcontroller returns to step 102. The timeout loop provided by step 102 serves two purposes. One purpose is to provide the inactive interval of the modulation component of the disruption signal. Another purpose is to provide a settling delay for transient signals at the collector of transistor Q1, so that the continuity of the coupling structure connection can subsequently be tested.

In step 104, the microcontroller determines whether TEST2 is in a high or low logical condition. During step 104, TEST1 remains asserted so that transistor Q1 is maintained in a conductive condition. If continuity exists between terminals 40a and 40b, then the input to terminal TEST2 will be high. If, in step 104, TEST2 is determined to be low, then execution precedes to step 105. Otherwise, the microcontroller proceeds to step 106.

In step 105, the microcontroller asserts the ALARM output terminal in order to cause an audible alarm to be emitted from a piezoelectric speaker 90. The purpose of the alarm is to notify the user that, pursuant to the decision of step 104, a continuity break has been detected. Then, maintaining the ALARM terminal in an asserted condition, the microcontroller returns to step 104.

In step 106, the ALARM terminal is set to zero in order to cancel any previous alarm. Proceeding in step 106, the microcontroller prepares to generate the active interval of the disruption signal. Terminals TEST1 and TEST2 are tri-stated. In the tri-stated condition, terminals TEST1 and TEST2 are neither high nor low, but are effectively disconnected so that terminals TEST1 and TEST2 do not sink or source current. Also during step 106, the TIME1 register is again loaded with K1. The microcontroller then proceeds to step 108.

In step 108, the microcontroller determines whether the FREQ input is high or low. The logical condition of the FREQ input is determined by switch 92, which can be set by the user to select one of two operating frequencies (e.g. 7 kHz or 10 kHz). If, in step 108, FREQ is high then the microcontroller proceeds to step 110. Otherwise the microcontroller proceeds to step 112.

In step 110, the microcontroller loads an internal register, DEL, with a predetermined constant value K3. The value contained within the DEL register will be employed to control a timeout loop for producing the carrier signal component of the disruption signal. After step 110 the microcontroller proceeds to step 114.

In step 112, the DEL register is loaded with a predetermined constant K2. The microcontroller then proceeds to step 114.

In step 114, a timeout register, TIME2, is loaded with the value contained within the DEL register. The value contained within the timeout register TIME2 is employed to determine the frequency of the carrier component of the disruption signal. As described above, the DEL register is previously loaded, during either step 112 or step 110, with one of two predetermined constants, K2 or K3, in dependence upon the setting of frequency selection switch 92. After step 114, the microcontroller proceeds to step 116.

In step 116 the logical condition of the XMIT terminal is inverted and latched. In the initial execution of step 116, XMIT is inverted from 0, as originally set in step 100, to 1. The microcontroller then proceeds to step 118.

In step 118, the value contained within register TIME1 is decremented and compared with zero. If the resulting value of TIME1 is equal to zero, the microcontroller returns to step 100. Otherwise the microcontroller proceeds to step 120.

In step 120, the value contained within register TIME2 is decremented and compared with zero. If the resulting value of TIME2 is not equal to zero, then the microcontroller proceeds to repeat step 120 until TIME2 is decremented to zero. Then, the microcontroller returns to step 114. As can be appreciated, the microcontroller will continue to loop through steps 114, 116, 118, and 120, for an interval of time determined by the value of K1 initially loaded into register TIME1. Additionally, during the interval governed by timeout register TIME1, the XMIT terminal will be toggled on and off at a frequency determined by the selected value (K2 or K3) contained within the DEL register. The value of constant K1 is selected in accordance with the processing speed of the microcontroller and the desired modulation frequency of the disruption signal. The values of constants K2 and K3 are similarly selected to provide the desired carrier frequency of the disruption signal.

Figure 7:
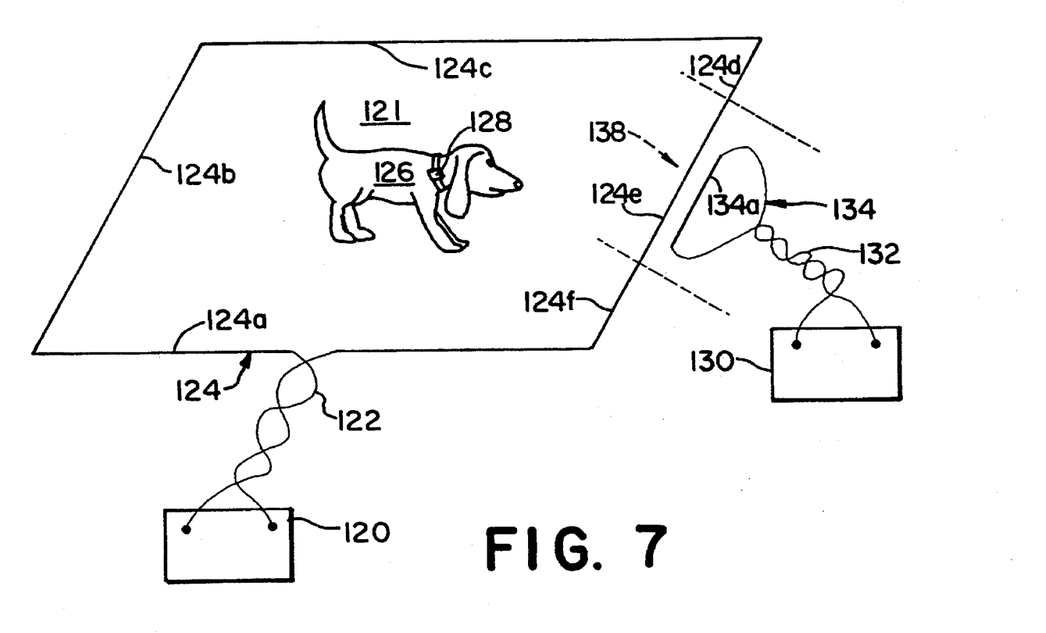
FIG. 7 is a diagram of an electronic animal control system having a disruption generator and a disruption antenna for defining a corridor of safe passage for the animal.

An alternative use for a disruption generator of any of the types described hereinabove is to negate the effect of an electronic animal control system along a selected portion of the perimeter. Referring now to FIG. 7, there is shown an animal control transmitter 120 connected to provide a predetermined electromagnetic signal to a wire loop animal control antenna 124, via a twisted pair of conductors 122. The wire loop animal control antenna 124 confines an area 121, bounded by the perimeter segments 124a–f of the animal control antenna 124. A disruption generator 130 is connected to provide a disruption signal to a wire loop disruption antenna 134 via a twisted pair of conductors 132. The wire loop disruption antenna 134 includes a segment 134a that is located adjacent to segment 124e of the animal control antenna 124.

A dog 126, located in the area 121 and wearing a control collar 128 adapted for operation in conjunction with the transmitter 120, will be discouraged from moving across, or approaching, the perimeter segments 124a–d and 124f of the control antenna 124. Along segment 124e of the control antenna 124, the disruption signal radiated by segment 134a of the disruption antenna interferes with reception of the predetermined electromagnetic signal by the receiver 128. Hence, the animal 126 will not be discouraged from moving across or approaching segment 124e of the animal control antenna 124. The location of segment 134a of the disruption antenna 134 adjacent to segment 124e of the control antenna 124, in effect, provides a corridor 138 through which the dog 126 may pass out of, or into, the area 121.

Such an arrangement as shown in FIG. 7 can be used to provide an animal control system wherein the control antenna is configured to enclose a yard adjacent to a house, in contrast to control systems wherein the control antenna is configured to surround a house. For example, a control antenna is installed to enclose the back yard of the house, while a disruption antenna is configured to have a portion thereof adjacent to the portion of the control antenna along the rear of the house, or at least along a rear entranceway to the house. The mutually adjacent portions of the control antenna and the disruption antenna then provide a corridor through which the animal may freely enter or exit the house via the entranceway. In other applications, an arrangement of the type shown in FIG. 7 can be employed to provide a corridor between adjacent areas defined by separate animal control antennae.

The terms and expressions which have been employed are used as terms of description and not of limitation. There is no intention in the use of such terms and expressions of excluding any equivalents of the features shown and described or any portions thereof. It is recognized, therefore, that various modifications are possible within the scope of the invention as claimed.

That which is claimed is:

1. An animal control system for controlling the movement of an animal relative to a predetermined area in the vicinity of a coupling structure configured to couple and reradiate incident electromagnetic radiation, the system comprising:

a) a transmitter for generating a predetermined electromagnetic signal;

b) an antenna connected with the transmitter and configured for positioning at the selected area;

c) a receiver mounted to the animal for receiving the predetermined electromagnetic signal and having transducer means for applying a stimulus to the animal in response to receiving said predetermined electromagnetic signal; and d) a disruption generator for connection with said coupling structure, said disruption generator configured for producing a second electromagnetic signal for disrupting reception of said predetermined electromagnetic signal by said receiver in the vicinity of the coupling structure.

2. The animal control system of claim 1 wherein said transmitter is configured for producing said predetermined electromagnetic signal having a carrier component at a carrier frequency and a modulation component, and wherein said disruption generator is configured for producing said second electromagnetic signal having a carrier component at said carrier frequency and a modulation component different from the modulation component of said predetermined electromagnetic signal.

3. The animal control system of claim 2 wherein said modulation component of said predetermined electromagnetic signal is characterized by a first modulation frequency, and said modulation component of said second electromagnetic signal is characterized by a second modulation frequency.

4. The animal control system of claim 3 wherein said second modulation frequency is greater than said first modulation frequency.

5. The animal control system of claim 3 wherein said second modulation frequency is about 120 Hz.

6. The animal control system of claim 5 wherein said second modulation frequency is supplied by full-wave rectified AC power.

7. The animal control system of claim 2 wherein said disruption generator is configured for producing said second electromagnetic signal as a continuous signal at said carrier frequency.

8. The animal control system of claim 2 wherein said predetermined electromagnetic signal is characterized by alternating intervals of relative activity and inactivity of said carrier component, and said second electromagnetic signal includes intervals of activity during inactive intervals of said predetermined electromagnetic signal.

9. The animal control system of claim 8 wherein said disruption generator is connected to a coupling structure comprising a utility conduit.

10. The animal control system of claim 9 wherein said utility conduit is at least one of a plumbing conduit and a cable television line.

11. The animal control system of claim 8 wherein said coupling structure comprises an architectural feature of a building within the predetermined area.

12. The animal control system of claim 1 wherein said disruption generator is connected to a coupling structure comprising a utility conduit.

13. The animal control system of claim 12 wherein said utility conduit is at least one of a plumbing conduit and a cable television line.

14. The animal control system of claim 12 wherein said antenna comprises a wire defining the perimeter of the predetermined area and wherein the coupling structure is located within the predetermined area.

15. The animal control system of claim 1 wherein said coupling structure comprises an architectural feature of a building within the predetermined area.

16. The animal control system of claim 1 wherein said disruption generator comprises an alarm indicator for indicating electrical continuity between the disruption generator and the coupling structure.

17. The animal control system of claim 16 wherein said disruption generator comprises adjustment means for adjusting the magnitude of the second electromagnetic signal to define the vicinity in which reception is disrupted.

18. The animal control system of claim 16 wherein said disruption generator comprises a microcontroller programmed to detect continuity and to responsively operate the alarm indicator.

19. The animal control system of claim 1 wherein said disruption generator is connected to the coupling structure via a first connection applying a first voltage to the coupling structure, the disruption generator comprising switching means connected to the coupling structure via a second connection and configured for switching said second connection into contact with a second voltage at a rate determining the second electromagnetic signal.

20. The animal control system of claim 19 wherein said disruption generator comprises an alarm indicator for indicating electrical continuity between the disruption generator and the coupling structure by determining whether said first voltage is present at the second connection.

21. The animal control system of claim 19 wherein said disruption generator comprises an alarm indicator for indicating electrical continuity between the disruption generator and the coupling structure, the alarm indicator including a sensor in series with the coupling structure for sensing a flow of electrical current within the coupling structure.

22. The animal control system of claim 19 wherein said antenna comprises a wire defining the perimeter of the predetermined area and wherein the coupling structure is located within the predetermined area.

23. The animal control system of claim 1 wherein said antenna comprises a wire defining the perimeter of the predetermined area and wherein the coupling structure is located within the predetermined area.

24. An animal control system for controlling the movement of an animal relative to a predetermined area, comprising:

a) a transmitter for generating a predetermined electromagnetic signal;

b) an antenna connected with the transmitter and configured for positioning at the selected area;

c) a receiver mounted to the animal for receiving the predetermined electromagnetic signal and having transducer means for applying a stimulus to the animal in response to receiving said predetermined electromagnetic signal; and d) a disruption generator configured for
   producing a second electromagnetic signal for disrupting reception of said predetermined electromagnetic signal at a selected portion of the selected area.

25. The animal control system of claim 24 wherein said antenna comprises a wire defining the perimeter of the predetermined area and wherein the selected portion of the selected area comprises a segment of the perimeter.

26. The animal control system of claim 24 or 25 wherein said transmitter is configured for producing said electromagnetic signal having a carrier component at a carrier frequency and a modulation component, and wherein said disruption generator is configured for producing said second electromagnetic signal having a carrier component at said carrier frequency and a modulation component different from the modulation component of said predetermined electromagnetic signal.

27. The animal control system of claim 26 wherein said modulation component of said predetermined electromagnetic signal is characterized by a first modulation frequency, and said modulation component of said second electromagnetic signal is characterized by a second modulation frequency.

28. The animal control system of claim 27 wherein said second modulation frequency is greater than said first modulation frequency.

29. The animal control system of claim 26 wherein said disruption generator is configured for producing said second electromagnetic signal as a continuous signal at said carrier frequency.

30. The animal control system of claim 24 or 25 wherein said predetermined electromagnetic signal is characterized by alternating intervals of relative activity and inactivity of said carrier component, and said second electromagnetic signal includes intervals of activity during inactive intervals of said predetermined electromagnetic signal.

31. The animal control system of claim 25 wherein the disruption generator comprises a second antenna for radiating said second electromagnetic signal along the segment of the perimeter.

32. The animal control system of claim 31 wherein the second antenna comprises a wire positioned along the segment of the perimeter.

33. A method of preventing undesired correction of an animal by an electronic animal control system for controlling the movement of the animal within a predetermined area containing a conductive structure configured to couple an electromagnetic control signal produced by the animal control system, the method comprising:

(a) connecting a disruption generator to the conductive structure; and (b) operating the disruption generator to produce a disruption signal effective to disable operation of the animal control system in the vicinity of the conductive structure.

34. The method of claim 33 wherein the connecting step comprises connecting the disruption generator to a utility conduit.

35. The method of claim 33 wherein the connecting step comprises connecting the disruption generator to an architectural feature of a building within the predetermined area.

36. The method of claim 33 wherein the operating step comprises the step of producing the disruption signal at about the same frequency as the electromagnetic control signal in order to interfere with detection of a modulated component of the electromagnetic control signal.

* * * * *